United States Patent
Haeusser

(10) Patent No.: US 10,738,893 B2
(45) Date of Patent: Aug. 11, 2020

(54) VALVE ARMATURE FOR A SOLENOID VALVE, AND CORRESPONDING SOLENOID VALVE

(71) Applicant: Robert Bosch GmbH, Stuttgart (DE)

(72) Inventor: Bernd Haeusser, Neckarwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 295 days.

(21) Appl. No.: 15/475,384

(22) Filed: Mar. 31, 2017

(65) Prior Publication Data
US 2017/0292614 A1    Oct. 12, 2017

(30) Foreign Application Priority Data

Apr. 11, 2016   (DE) .................. 10 2016 205 988

(51) Int. Cl.
| | | |
|---|---|---|
| F16K 1/32 | (2006.01) | |
| F16K 31/06 | (2006.01) | |
| F16K 1/36 | (2006.01) | |

(52) U.S. Cl.
CPC ............ F16K 1/32 (2013.01); F16K 31/0675 (2013.01); F16K 1/36 (2013.01)

(58) Field of Classification Search
CPC ..... F16K 1/32; F16K 1/34; F16K 1/36; F16K 31/0655; H01F 2007/086
USPC ...................... 251/129.15; 335/203, 255, 279
See application file for complete search history.

(56) References Cited

U.S. PATENT DOCUMENTS

| | | | | |
|---|---|---|---|---|
| 2,311,506 | A * | 2/1943 | Arey | F16K 1/48 251/85 |
| 3,381,351 | A * | 5/1968 | Szwargulski | B29C 45/14262 137/434 |
| 3,625,245 | A * | 12/1971 | Biermann | F16K 1/36 137/404 |
| 4,408,745 | A * | 10/1983 | Swiers | F16K 1/34 137/315.12 |
| 4,573,611 | A * | 3/1986 | O'Connor | F16K 1/36 137/316 |
| 4,982,757 | A * | 1/1991 | Ohasi | B60K 15/03519 137/202 |
| 5,538,219 | A * | 7/1996 | Osterbrink | F02M 25/0836 251/129.05 |
| 2002/0063228 | A1* | 5/2002 | Shost | F02M 25/0836 251/129.15 |
| 2005/0199847 | A1* | 9/2005 | Hatano | F16K 1/36 251/129.15 |
| 2007/0001137 | A1* | 1/2007 | Kingsford | F16K 1/34 251/122 |
| 2007/0068574 | A1* | 3/2007 | Kito | F16K 1/36 137/202 |

(Continued)

FOREIGN PATENT DOCUMENTS

DE   10 2007 051 557 A1   4/2009

*Primary Examiner* — Seth W. Mackay-Smith
(74) *Attorney, Agent, or Firm* — Maginot, Moore & Beck LLP

(57) ABSTRACT

A valve armature for a solenoid valve includes a main body and a tappet that interacts with a valve seat. The main body and the tappet are connected to one another via a connecting apparatus. The connecting apparatus has at least one first latching element that is arranged on the tappet and at least one second latching element that is arranged on the main body. The latching elements are configured for a positively locking and/or non-positive latching connection.

13 Claims, 4 Drawing Sheets

(56) References Cited

U.S. PATENT DOCUMENTS

| | | | | |
|---|---|---|---|---|
| 2010/0252125 | A1* | 10/2010 | Roth | F16K 1/02 |
| | | | | 137/409 |
| 2013/0298880 | A1* | 11/2013 | Pifer | F02M 25/0836 |
| | | | | 123/520 |
| 2016/0109028 | A1* | 4/2016 | Querejeta Andueza | |
| | | | | F16K 3/0254 |
| | | | | 137/78.1 |
| 2016/0186526 | A1* | 6/2016 | Elliott | E21B 34/02 |
| | | | | 166/377 |
| 2017/0306866 | A1* | 10/2017 | Lenk | F16K 27/029 |

* cited by examiner

VALVE ARMATURE FOR A SOLENOID VALVE, AND CORRESPONDING SOLENOID VALVE

This application claims priority under 35 U.S.C. § 119 to patent application no. DE 10 2016 205 988.2, filed on Apr. 11, 2016 in Germany, the disclosure of which is incorporated herein by reference in its entirety.

BACKGROUND

The disclosure proceeds from a valve armature for a solenoid valve and from a solenoid valve according to the disclosure.

Normally open or closed solenoid valves are known from the prior art, which solenoid valves are used, for example, as inlet valves or outlet valves in a hydraulic assembly of a vehicle brake system. Via the hydraulic assembly, control and/or regulating operations can be carried out in an anti-lock brake system (ABS) or an anti-slip regulation system (ASR system) or an electronic stability program system (ESP system) for the buildup or dissipation of pressure in corresponding wheel brake calipers. Solenoid valves of this type comprise a magnet assembly and a valve cartridge. The valve cartridge comprises a pole core, a guide sleeve which is connected to the pole core, and a valve armature which is guided within the guide sleeve such that it can be moved axially between a closed position and an open position counter to the force of a restoring spring. The valve armature can have a main body and a tappet. In the closed position, the tappet interacts with a valve seat in a sealing manner and interrupts a fluid flow between at least one first flow opening and at least one second flow opening. In the open position, the tappet is raised up from the valve seat and makes the fluid flow possible between the at least one first flow opening and the at least one second flow opening. A magnetic force is generated by way of the energization of the magnet assembly, which magnetic force moves the main body with the tappet from the open position into the closed position in the case of a normally open solenoid valve, until the tappet comes into contact with the corresponding valve seat and seals the latter. In the non-energized state, the restoring spring moves the main body with the tappet, and the tappet lifts up from the valve seat and releases the latter. In the case of a normally closed solenoid valve, the main body with the tappet is moved from the closed position into the open position by way of the energization of the magnet assembly, and the tappet lifts up from the valve seat and releases the latter. If the current is switched off, the restoring spring moves the main body with the tappet in the direction of the valve seat until the tappet comes into contact with the valve seat and seals the latter.

Laid open specification DE 10 2007 051 557 A1 describes, for example, a normally closed solenoid valve for a slip-regulated, hydraulic vehicle brake system. The solenoid valve comprises a hydraulic part which is also called a valve cartridge and is arranged partially in a stepped bore of a valve block, and an electric part which is formed substantially from a magnet assembly which is plugged onto that part of the valve cartridge which protrudes out of the valve block. The magnet assembly comprises a coil body with an electric winding, a coil shell which conducts magnetic flux, and an annular disk which conducts magnetic flux. The hydraulic part has a guide sleeve which, at its end which faces the electric part, is closed by way of a pole core which is pressed in and welded in a fluid-tight manner. A longitudinally displaceable armature is received in the guide sleeve, which armature is supported on the pole core by way of a restoring spring. Facing away from the pole core, the armature has a spherical closing body which is arranged in a depression. At the end which faces away from the pole core, a pot-shaped valve sleeve with a cylindrical shell and a bottom is pressed into the guide sleeve. At the bottom, the valve sleeve has a passage and a hollow-conical valve seat which configures a seat valve with the closing body. By way of the seat valve, a fluid connection between the passage at the bottom of the valve sleeve and at least one passage in the shell of the valve sleeve is configured so as to be switchable. In addition, a radial filter is arranged on the outside of the shell of the valve sleeve, in order to filter dirt particles out of the fluid flow. The guide sleeve can be calked by means of a fastening bush in the stepped bore of the valve block.

SUMMARY

The valve armature according to the disclosure for a solenoid valve has the advantage, in contrast, that reliable opening and closing of the corresponding solenoid valve can be achieved by way of a latching connection which connects a tappet and a main body to one another in a positively locking and/or non-positive manner. By way of the use of at least one first latching element which is arranged on the tappet and at least one second latching element which is arranged on the main body, the at least one first latching element and the at least one second latching element configuring the positively locking and/or non-positive latching connection, release of the tappet from the main body in the case of energization of the solenoid valve or in the case of a spring force acting can at least be made difficult or can be suppressed completely. Here, in the case of a normally closed solenoid valve, the main body can be attracted by a pole core, and the tappet which is connected to the main body lifts up from the valve seat. As an alternative, in the case of a normally open solenoid valve, the main body can be moved by the spring force of a spring element, the tappet which is connected to the main body lifting up from the valve seat. The reliable lifting up of the tappet from the valve seat can be achieved in an advantageous way by way of the reliable latching connection between the tappet and the main body.

In this way, embodiments of the present disclosure contribute to the improvement of the reliability of the solenoid valve. The positively locking connection and/or non-positive connection which is formed by the latching connection connects the tappet to the main body independently of prevailing temperatures or other external influences which act on the tappet or the main body. Here, for example, different coefficients of expansion of the tappet and the main body do not have a negative effect on the connection.

Embodiments of the present disclosure provide a valve armature for a solenoid valve, which valve armature comprises a main body and a tappet which interacts with a valve seat. Here, the connecting apparatus has at least one first latching element which is arranged on the tappet and at least one second latching element which is arranged on the main body, the latching elements configuring a positively locking and/or non-positive latching connection.

In addition, a solenoid valve is proposed having a magnet assembly and a valve cartridge which has a valve sleeve, a valve body with a valve seat, and such a valve armature which is mounted axially movably in the valve sleeve, with a tappet.

Advantageous improvements of the valve armature for a solenoid valve are possible by way of the measures and developments which are described in the dependent claims.

In one advantageous refinement, the at least one first latching element or the at least one second latching element can be configured as a resilient latching bracket. Here, the latching bracket can have a latching lug which hooks and/or latches with a corresponding countercontour. The non-positive connection between the tappet and the main body can be achieved in an advantageous way by way of the spring force of the resilient latching bracket. Here, the tappet or the main body can have the at least one latching bracket.

In a further advantageous refinement, the at least one second latching element or the at least one first latching element can be configured as a latching edge. The latching edge can configure the countercontour for the latching bracket or for the latching lug of the latching bracket in an advantageous way. The latching edge can be configured as a bead and/or as a projection, and/or as an undercut and/or as an edge of a cutout and/or as an edge of a groove.

In a further advantageous refinement, the tappet can be configured as an injection molded plastic part, onto which the at least one first latching element which is configured as a latching bracket can be formed integrally. In an advantageous way, tappets with different dimensions can be manufactured simply by way of injection molding processes. In addition, injection molded plastic parts can be manufactured inexpensively from thermoplastics. Furthermore, a tappet which is configured as an injection molded plastic part produces less disruptive noise when coming into contact with the valve seat, in contrast to a metallic tappet. As a result, the closing noise which occurs during closing can be reduced in an advantageous way and, in the optimum case, can even be suppressed virtually completely. Furthermore, the tappet which is configured as an injection molded plastic part is lighter than a comparable metallic tappet. Furthermore, the at least one first latching element can also be cast integrally in a simple manner during the plastic injection molding.

In a further advantageous refinement, the main body can be configured as a metal part, the at least one second latching element which is configured as a latching edge being introduced into the main body. The latching edge can be manufactured in an advantageous way by means of turning and/or milling and/or sintering and/or cold working.

In a further advantageous refinement, the at least one first latching element which is configured as a latching bracket can bear against an outer wall of the main body. The positively locking connection between the main body and the tappet can be implemented in an advantageous way by way of the contact of the resilient latching bracket.

In a further advantageous refinement, at least two first latching elements which are configured as latching brackets can be arranged so as to lie opposite one another and can configure the corresponding latching connections with at least two corresponding latching edges which are arranged so as to lie opposite one another. In an advantageous way, an end region of the main body which faces the tappet can be clamped between the at least two latching brackets, with the result that a further positively locking and/or non-positive clamping connection can be produced in addition to the latching connections.

In a further advantageous refinement, the tappet and the main body can be connected to one another additionally via a press-fit connection. Here, the main body can have a receiving opening on an end wall which faces the tappet, into which receiving opening a first end region of the tappet which faces the main body can be introduced and pressed. During pressing of the tappet into the main body, the at least one first latching element which is configured as a latching bracket with a latching lug can latch into the at least one second latching element which is configured as a latching edge.

BRIEF DESCRIPTION OF THE DRAWINGS

One exemplary embodiment of the disclosure is shown in the drawings and will be described in greater detail in the following description. In the drawings, identical designations denote components or elements which carry out identical or analogous functions.

DETAILED DESCRIPTION

Figure 5:
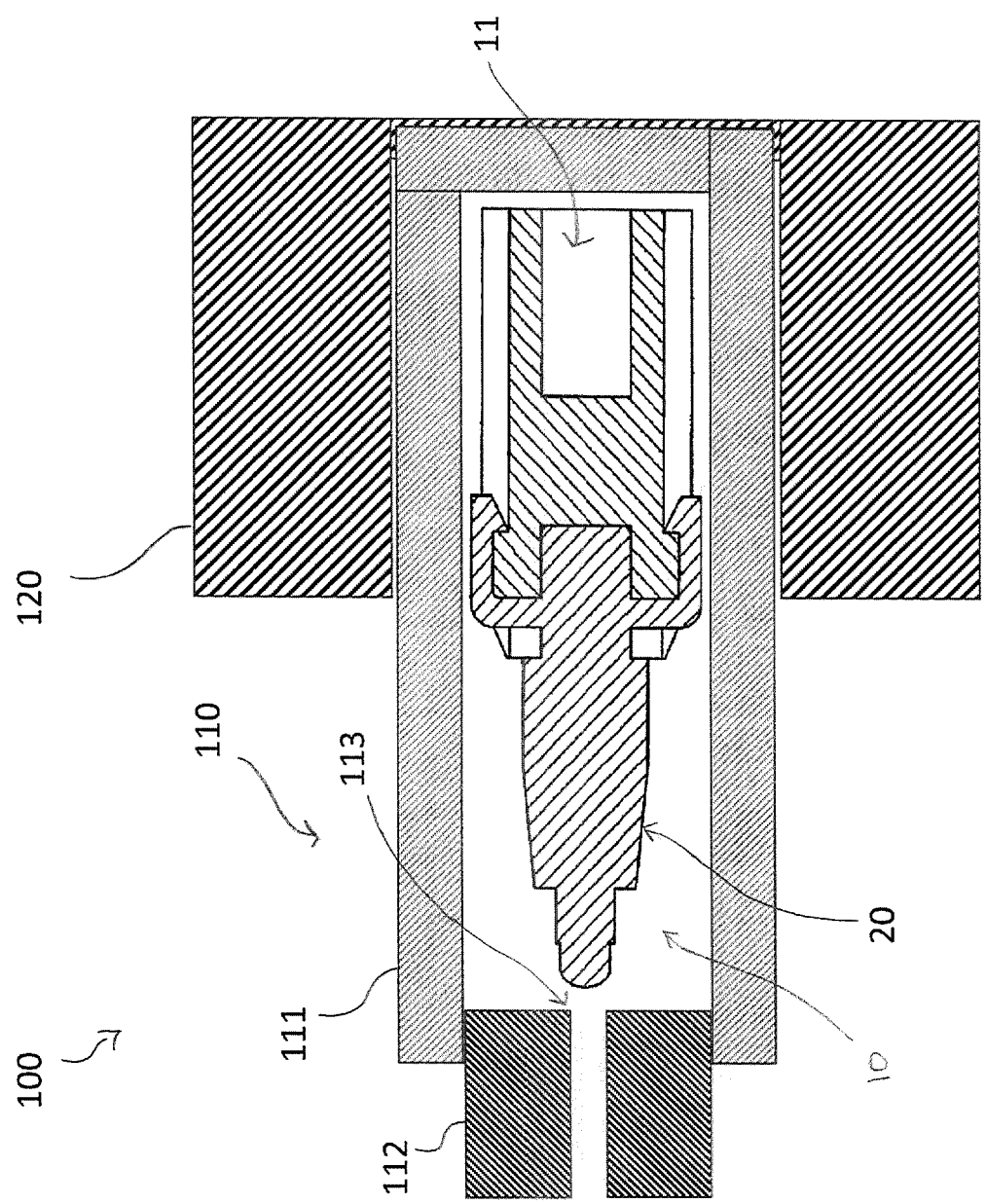
FIG. 5 shows a diagrammatic sectional illustration of a solenoid valve that includes the valve armature from FIG. 1.

FIG. 5 illustrates a solenoid valve 100 that includes a valve cartridge 110 and a magnetic assembly 120. The valve cartridge 110 includes a pole core, a guide or valve sleeve 111 which is connected to the pole core, and a valve armature 10 which is guided within the guide sleeve 111 such that it can be moved axially between a closed position and an open position counter to the force of a restoring spring. A valve body 112 defines a valve seat 113 arranged between at least one first flow opening and at least one second flow opening. As can be seen from FIG. 1, the valve armature 10 comprises a main body 11 and a tappet 20. The tappet 20 interacts with the valve seat 113 in a sealing manner in the closed position and interrupts a fluid flow between the at least one first flow opening and the at least one second flow opening. In the open position, the tappet 20 is lifted up from the valve seat 113 and makes the fluid flow possible between the at least one first flow opening and the at least one second flow opening. A magnetic force is generated by way of the energization of the magnet assembly 120, which magnetic force is configured to move the main body 11 with the tappet 20 to one or more of the open and closed positions.

Figure 1:
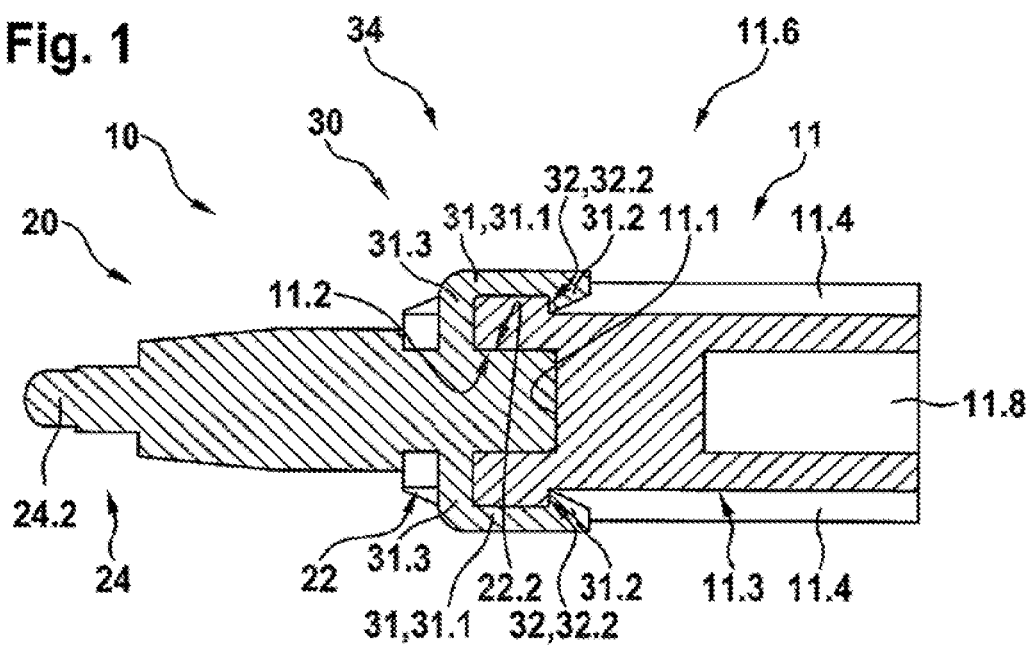
FIG. 1 shows a diagrammatic sectional illustration of one exemplary embodiment of a valve armature according to the disclosure.
Figure 2:
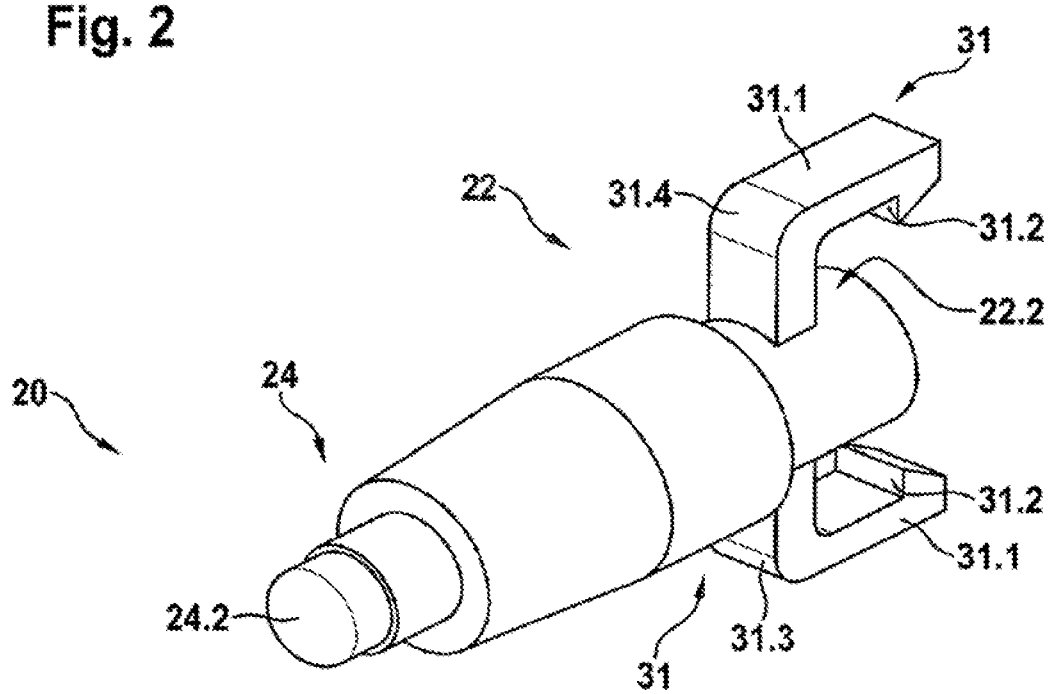
FIG. 2 shows a diagrammatic perspective illustration of a tappet of the valve armature according to the disclosure from FIG. 1.
Figure 3:
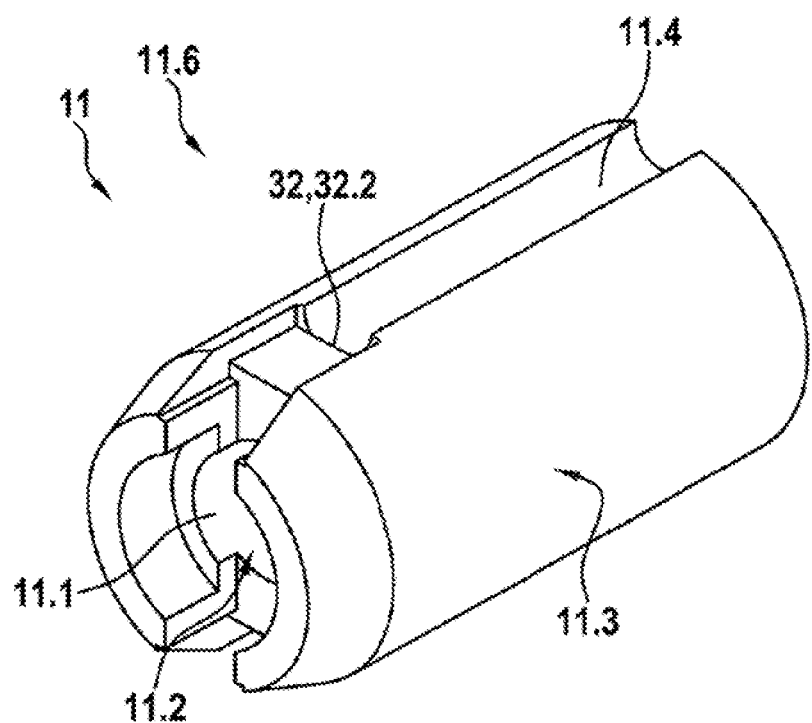
FIG. 3 shows a diagrammatic perspective illustration of a main body of the valve armature according to the disclosure from FIG. 1.

As can be seen from FIGS. 1 to 3, the valve armature 10 for a solenoid valve in the exemplary embodiment which is shown comprises the main body 11 and the tappet 20 which interacts with the valve seat, the main body 11 and the tappet 20 being connected to one another via a connecting apparatus 30. Here, the connecting apparatus 30 has at least one first latching element 31 which is arranged on the tappet 20 and at least one second latching element 32 which is arranged on the main body 11, the latching elements 31, 32 configuring a positively locking and/or non-positive latching connection.

Figure 4:
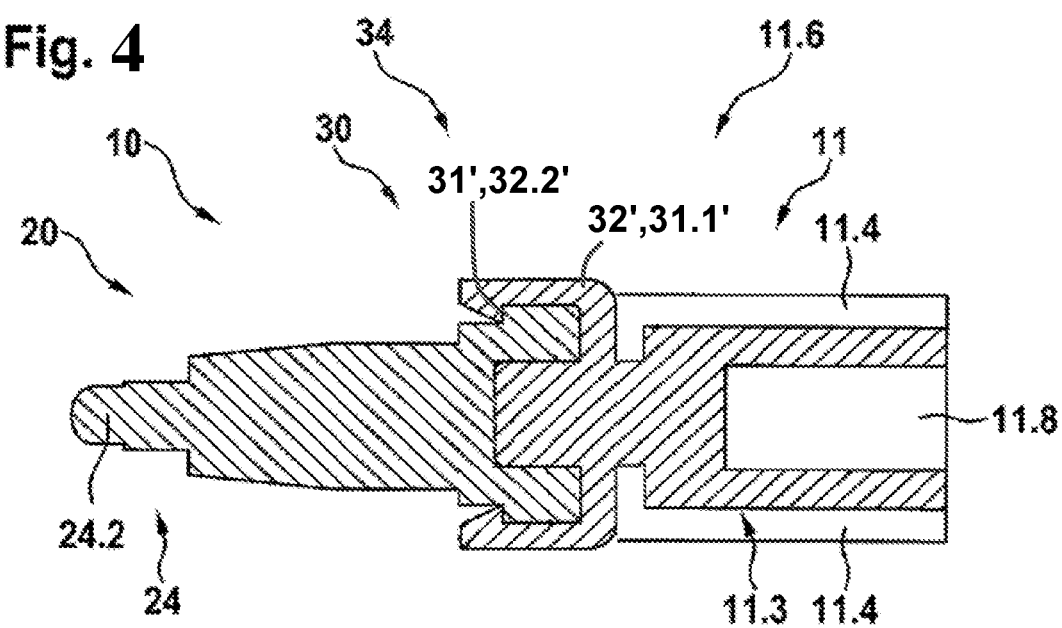
FIG. 4 shows a diagrammatic sectional illustration of an alternative embodiment of a valve armature according to the disclosure.

As can be seen, furthermore, from FIGS. 1 to 3, the at least one first latching element 31 is configured as a resilient latching bracket 31.1 and the at least one second latching element 32 is configured as a latching edge 32.2 in the exemplary embodiment which is shown. In an alternative exemplary embodiment illustrated in FIG. 4, the at least one second latching element 32' is configured as a resilient latching bracket 31.1' and the at least one first latching element 31' is configured as a latching edge 32.2'.

As can be seen, furthermore, from FIGS. 1 and 2, the tappet 20 in the exemplary embodiment which is shown is configured as an injection molded plastic part, onto which the at least one first latching element 31 which is configured as a latching bracket 31.1 is integrally cast or molded. The injection molded plastic part is manufactured from a thermoplastic. Other suitable plastics can also be used for manufacturing the tappet 20. The at least one first latching element 31 has a latching lug 31.2 at one end region. Furthermore, the at least one latching bracket 31.1 projects substantially perpendicularly from a pin-shaped first end region 22 of the tappet 20 which faces the main body 11, and has a right-angled bend 31.3. As a result, the at least one first latching element 31 which is configured as a latching bracket 31.1 bears against an outer wall 11.3 of the main body 11. In an alternative exemplary embodiment illustrated in FIG. 4, the latching brackets 31.1' can also be arranged on the main body 11 and can configure the latching connection with a latching edge 32.2' on the tappet 20. A closing body 24.2 is arranged at a second end region 24 of the tappet 20 which faces the valve seat and faces away from the main body 11. In the exemplary embodiment which is shown, the closing body 24.2 is configured as a spherical cap and is molded integrally onto the cylindrical tappet 20. It goes without saying that other suitable geometric shapes can also be used for the closing body 24.2 and the tappet 20. Thus, the closing body 24.2 can be configured, for example, as a cone or as a truncated cone. In order to achieve an additional damping action, the closing body 24.2 can be configured as an injection molded plastic part, such as a PEEK part. The tappet 20 has a smaller external diameter at the second end region 24 which faces the valve seat and faces away from the main body 11 than at the first end region 22 which faces the main body 11.

As can be seen, furthermore, from FIGS. 1 and 3, the main body 11 in the exemplary embodiment which is shown is configured as a metal part, the at least one second latching element 32 which is configured as a latching edge 32.2 being introduced into the main body 11. In the exemplary embodiment which is shown, the main body 11 is configured as a sintered iron component. The main body 11 has a cavity 11.8, in which a restoring spring (not shown) can be guided. As an alternative, the main body 11 can also have a different magnetizable material. Furthermore, the main body 11 can also be configured as a cold peened part, in order to be brought into a predefined shape. By way of the energization of a magnet assembly (not shown in greater detail), a magnetic force is generated which moves the main body 11, configured as a sintered iron component, of the valve armature 10 of a normally open solenoid valve from the open position into the closed position. Here, the tappet 20 which is connected to the main body 11 comes into contact with the corresponding valve seat (not shown in greater detail) and seals the latter. In the non-energized state, the restoring spring moves the main body 11 with the tappet 20 back into the starting position, and the tappet 20 lifts up from the valve seat and releases the latter. In the case of a normally closed solenoid valve, the main body 11 with the tappet 20 is moved from the closed position into the open position by way of the energization of the magnet assembly, and the tappet 20 lifts up from the valve seat and releases the latter. If the current is switched off, the restoring spring moves the main body 11 with the tappet 20 back in the direction of the valve seat and presses the tappet 20 into the valve seat and seals the latter.

As can be seen, furthermore, from FIG. 1, the tappet 20 and the main body 11 are additionally connected to one another via a press-fit connection 34. For this purpose, the main body 11 has a receiving opening 11.1 on a side wall which faces the tappet 20. The first end region 22 of the tappet 20 which faces the main body 11 is introduced and pressed into said receiving opening 11.1. The first end region 22 of the tappet 20 which faces the main body 11 is of pin-shaped configuration. As a result, an inner wall 11.2 of an end region 11.6 of the main body 11 bears against an outer wall 22.2 of the first end region 22 of the tappet 20.

As can be seen, furthermore, from FIG. 1, the latching lugs 31.2 engage into the latching edges 32.2 and configure the positively locking and/or non-positive clip-like latching connection. In the exemplary embodiment which is shown, the main body 11 has two grooves 11.4 on the outer wall 11.3 which run in the longitudinal direction and end at the level of the receiving space 11.1. The grooves 11.4 can be introduced into the main body 11 by means of turning or milling or sintering or cold forming or by means of a combination of the stated processes. A projection is produced here which acts as a latching edge 32.2. As an alternative, the latching edge 32.2 can also be configured as a bead or as a projection on the outer wall 11.3 of the main body 11 or as an undercut and/or as an edge of a cutout of the main body 11. The tappet 20 has two first latching elements 31 which are configured as latching brackets 31.1. The two latching brackets 31.1 are arranged so as to lie opposite one another, and configure the corresponding latching connections with the two corresponding latching edges 31.2 which are arranged so as to lie opposite one another. Here, the end region 11.6 of the main body 11 which faces the tappet 20 is clamped between the two latching brackets 21.1 or between the latching brackets 21.1 and the outer wall 22.2 of the pin-shaped first end region 22 of the tappet 20. In an alternative exemplary embodiment, the tappet 20 can have more than two latching brackets 31.1 which are arranged distributed homogeneously on the circumference of the tappet 20 and between which the end region 11.6 of the main body 11 which faces the tappet 20 is clamped. For example, three latching brackets 31 which are at a spacing from one another of 120° or four latching brackets 31 which are at a spacing from one another of 90° and are arranged so as to lie opposite one another in pairs would be conceivable. Correspondingly, the main body 11 of the valve armature 10 then has three or four latching edges 32.2 which configure the corresponding three or four latching connections with the latching brackets 31.

Embodiments of the present disclosure provide a valve armature for a solenoid valve, which valve armature opens and closes reliably. By way of the use of at least one positively locking and/or non-positive latching connection which is configured by at least one first latching element which is arranged on the tappet and at least one second latching element which is arranged on the main body, release of a tappet from the main body in the case of energization of the solenoid valve or in the case of a spring force acting can at least be made difficult or can be suppressed completely.

What is claimed is:

1. A valve armature for a solenoid valve, comprising:
   a main body;
   a tappet that interacts with a valve seat; and a connecting apparatus configured to connect the main body and the tappet to one another along a central axis of the valve armature, the connecting apparatus having (i) at least two first latching elements that are arranged on the tappet and spaced evenly from one another about the central axis and (ii) at least two second latching elements that are arranged on the main body and spaced evenly from one another about the central axis, wherein the first and second latching elements are configured for one or more of a positively locking connection and a non-positive latching connection.

2. The valve armature according to claim 1, wherein the at least two first latching elements are each configured as a resilient latching bracket.

3. The valve armature according to claim 2, wherein the tappet is configured as an injection molded plastic part onto which the resilient latching brackets are formed integrally.

4. The valve armature according to claim 2, wherein the resilient latching brackets bear against an outer wall of the main body.

5. The valve armature according to claim 1, wherein the at least two second latching elements or are each configured as a latching edge.

6. The valve armature according to claim 5, wherein the main body is configured as a metal part, and wherein the latching edges are introduced into the main body.

7. The valve armature according to claim 1, wherein:
the at least two first latching elements include a further first latching element arranged on the tappet, the at least two first latching elements and the further first latching element spaced evenly from one another about the central axis, and
the at least two second latching elements include a further second latching element arranged on the main body, the at least two second latching elements and the further second latching element spaced evenly from one another about the central axis, and
the at least two second latching elements and the further second latching element correspond to the at least two first latching elements and the further first latching element.

8. The valve armature according to claim 1, wherein the tappet and the main body are additionally connected to one another via a press-fit connection.

9. The valve armature according to claim 8, wherein the main body has a receiving opening on an end wall that faces the tappet, and wherein a first end region of the tappet that faces the main body is configured to be introduced and pressed into the receiving opening.

10. The valve armature according to claim 1, wherein the at least two second latching elements are each configured as a resilient latching bracket.

11. The valve armature according to claim 1, wherein the at least two first latching elements are each configured as a latching edge.

12. A solenoid valve, comprising:
a magnet assembly; and
a valve cartridge including a valve sleeve, a valve armature that is mounted axially movably in the valve sleeve, and a valve body with a valve seat, the valve armature including:
a main body,
a tappet that interacts with the valve seat, and
a connecting apparatus configured to connect the main body and the tappet to one another along a central axis of the valve armature, the connecting apparatus having (i) at least one first latching element with a plurality of first latching portions arranged in circumferentially spaced relationship on the tappet and (ii) at least one second latching element with a plurality of second latching portions arranged in circumferentially spaced relationship on the main body,
wherein the first and second latching elements are configured for one or more of a positively locking connection and a non-positive latching connection.

13. A valve armature for a solenoid valve, comprising: a main body; a tappet that interacts with a valve seat; and a connecting apparatus configured to connect the main body and the tappet to one another along a central axis of the valve armature, the connecting apparatus having at least one first latching element that is arranged on the tappet and at least one second latching element that is arranged on the main body,
wherein the first and second latching elements are configured for one or more of a positively locking connection and a non-positive latching connection, and wherein the first latching element has a latching lug that defines a planar wedge oriented transversely with respect to the central axis and configured to temporarily radially deflect the first latching element so as to facilitate the connection between the first and second latching elements,
wherein the first latching element is configured as a resilient latching bracket that extends from an outer wall of the tappet, the latching lug disposed at a distal end of the resilient latching bracket, and
wherein the second latching element is disposed radially between the first latching element and the outer wall of the tappet when the first and second latching elements are connected with the one or more of the positively locking connection and the non-positive latching connection.

* * * * *